United States Patent [19]
Gundersen et al.

[11] Patent Number: 4,789,934
[45] Date of Patent: Dec. 6, 1988

[54] SIGNATURE VERIFICATION ALGORITHM

[75] Inventors: Steven C. Gundersen, Carmel; Thomas K. Worthington, New York, both of N.Y.

[73] Assignee: International Business Machines Corporation, Armonk, N.Y.

[21] Appl. No.: 820,846

[22] Filed: Jan. 21, 1986

[51] Int. Cl.⁴ .............................................. G06K 9/00
[52] U.S. Cl. ......................................... 364/419; 382/3
[58] Field of Search ...................... 364/419; 382/3, 37, 382/34; 235/379; 381/41

[56] References Cited

U.S. PATENT DOCUMENTS 4,128,829 12/1978 Herbst et al. ......................... 382/34
4,433,436 2/1984 Cranes ................................ 235/379
4,624,010 11/1986 Takebayashi ......................... 381/41
4,635,293 1/1987 Wataneba ............................. 382/37
4,651,341 3/1987 Nakashima et al. .................. 382/37

OTHER PUBLICATIONS

John S. Lew, "Optimal Accelerometer Layouts for Data Recovery in Signature Verification"; 1980, pp. 496–510.

C. N. Liu, "Automatic Signature Verification System Description and Field Test Results", Sep. 1978; pp. 35–38.

Primary Examiner—Joseph Ruggiero
Assistant Examiner—Kim Thanh Tbui
Attorney, Agent, or Firm—Douglas W. Cameron

[57] ABSTRACT

An improved signature verification method using dynamic signature characteristics in the frequency domain. Analysis of a signature in the frequency domain is employed when time domain analysis does not adequately distinguish between true signatures and forgeries. The preferred signature characteristics that are measured are two acceleration components of the pen, and the rate of change of axial pressure on the pen. More specifically, correlation functions operating on a sample and reference signature produce a correlation score. If the total correlation score is in a selected interval, then the above measured characteristics are analyzed in the frequency domain with the magnitude squared coherence function.

6 Claims, 6 Drawing Sheets

FIG. 4
NORMALIZED HISTOGRAM OF TOTAL CORRELATION SCORE

FIG. 5
NORMALIZED HISTOGRAM OF TOTAL COHERENCE SCORE

FIG. 6

SIGNATURE VERIFICATION ALGORITHM

DESCRIPTION

Field of the Invention

The present invention relates generally to the field of signature verification for authenticating the signer of a document, and more particularly to an improved signature verification method which utilizes signature characteristics in the frequency domain. This method, thereby, reduces the forgeries accepted as true signatures (type II errors) and true signatures rejected as forgeries (type I errors).

BACKGROUND OF THE INVENTION

There has always been a need in society for verifying a person's identity for a variety of purposes. Modern day scientific technology has adopted the widespread use of computers and related mechanisms for the purposes of giving credit, performing electronic funds transfer, and so forth. In all facets of the financial community including the retail, industry, securities industry, banking and the like, sums of money, securities and/or materials are transferred between owners based on the reliance of one person on the purported identity of another. Electronic systems including various cryptographic instrumentalities together with secret identity numbers or keys provide a certain amount of security; however, the amount of security is predicated upon the degree of secrecy with which one is able to secure his own special identification key. Obviously, once a person's key is learned by another, presumably an unauthorized person, the other person may falsely assume his identity for a wide variety of electronic applications.

Identity verification by means of written signatures has long been known in the art; however, most known systems have various shortcomings. Simply matching the appearance of two signatures is not satisfactory as expert forgers can usually duplicate the appearance of a person's signature as well as the person himself. The result of this is that when an expert forger is involved, even expert document examiners are frequently unable to discover that the signature is forged.

Recent developments in the field of automatic signature verification such as exemplified by U.S. Pat. No. 3,983,535 of Herbst et al and U.S. Pat. No. 4,128,829 of Herbst et al make the concept of personal identification via computer based signature analysis practical. The invention disclosed in U.S. Pat. No. 3,983,535 is based on the discovery that the accelerations of the stylus, which are proportional to the muscle forces exerted by the signer, are of predetermined consistent durations when forming particular strokes in a habitual signature. The nature of the process gives rise to various distortions in the time axis; e.g., pauses between sections of the name, skipped strokes, decorative rubrics, and the like. Thus, the signal is marked by regions of high correlation separated by variable regions of low correlation of unknown duration. Accordingly, the invention in U.S. Pat. No. 3,983,535 dealt with a method of regional correlation which registered these regions based initially on stylus contact and then shifting the regions individually to find the maximal of the correlation function weighted to penalize shifting. The results were then combined to make an overall verification decision.

Figure 1:
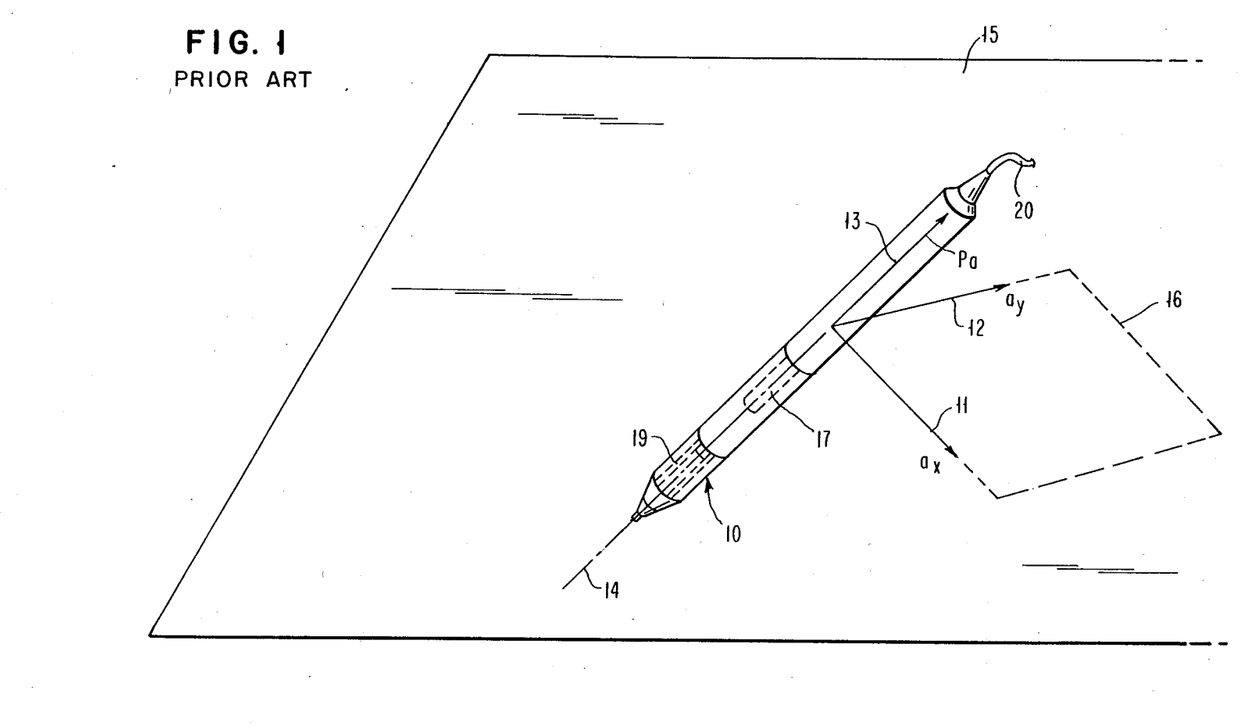
FIG. 1 is an overall schematic representation of the writing surface and writing instrument, showing axial pressure and X and Y acceleration components.

The signature verification method disclosed in U.S. Pat. No. 3,983,535 was based on a single acceleration parameter of the signature dynamic, but as disclosed in U.S. Pat. No. 4,128,829, an even greater discrimination in the verification operation is possible using two orthogonally disposed (e.g., X and Y axes) acceleration components together with the pressure patterns which are produced during the writing of the signature and utilizing all three of these individual parameters in the correlation operation. The invention disclosed in U.S. Pat. No. 4,128,829 retained the concept of segmenting the sample and reference signatures, correlating individual segment pairs utilizing a series of successive shifts to obtain the maximum possible correlation, weighting the correlations, and finally combining the individual correlation statistics for all segments. An example of a pen that may be used in Herbst et al verification system is disclosed in U.S. Pat. No. 4,142,175 of Herbst et al. This pen produces electrical signals proportional to accelerations along the X and Y axes and an electrical signal proportional to the pen point pressure along the Z-axis as shown in FIG. 1. The acceleration along the X-axis (Y-axis) is known as an acceleration component. The Z-axis is essentially parallel to the axis of the pen. The most recent development in writing instruments is described in U.S. Pat. No. 4,513,437 to Chainer et al. This patent discloses a pressure and acceleration sensing instrument. The pressure sensing element is axially mounted in the writing instrument and produces an electrical signal proportional to the rate of change of pressure. The accelerometer structure comprises bimorph piezoelectric members supported at one end, which are appropriately interconnected to produce two orthogonal acceleration components $A_x$ and $A_y$.

According to the Herbst et al procedure, reference acceleration and pressure signals are stored in memory in the electronic computer. Actually, as will be understood by those skilled in the art, digital representations of the acceleration and pressure signals are stored, and the acceleration and pressure signals produced by the pen when used to write a signature are also digitized so that all the arithmetical processing is performed digitally. In a typical system, when a customer opens an account, a signature acquisition feature on a computer terminal prompts the customer to sign his or her name several times. This produces signature data that is transmitted to the computer which selects the reference signals that are stored. Both the reference signals and the signals from the pen produced by a person whose signature is to be verified are segmented as a function of pen lifts which are detected by the pressure signal becoming zero. Pen lifts are critical to good correlation scores as they represent reproducible timing marks in the signature. The segmented acceleration and pressure signals from the pen are then compared with the corresponding reference acceleration and pressure signal segments using the correlation algorithm disclosed in U.S. Pat. No. 3,983,535 to Herbst et al.

A segment shifting technique to maximize the correlation for the segments of acceleration signals is disclosed in U.S. Pat. Nos. 4,562,592 and 4,553,259 to Chainer et al, assigned to the same assignee as the present application. The above patents (U.S. Pat. Nos. 4,562,592 and 4,553,259) and U.S. Pat. Nos. 3,983,535, 4,128,829, 4,142,175 and 4,513,437 are hereby incorporated herein by reference.

The latest development in signature verification methodology (U.S. Pat. No. 4,128,829) represents an improvement over past practices by applying correlation to pressure and to two orthogonal acceleration components; however, a difficulty arises with such method. Good forgery attempts as well as true signatures do yield scores near the threshold, which are comparable to a substantial portion of true signatures. Similarly, true signature can also yield scores comparable to those of forgeries. Thus, good forgeries will be accepted as true signatures and true signatures will be rejected. Hence, there is a need for a more reliable signature verification method which can distinguish between true signatures and forgeries particularly when correlation methods yield scores near the correlation threshold.

SUMMARY OF THE INVENTION

It is, therefore, an object of the invention to provide a more reliable test to determine the validity of a sample signature, particularly when such signature yields correlation scores near the correlation threshold for acceptance.

Accordingly, this invention provides an improved method of verifying a sample signature of a putative signer. This method comprises a number of basic steps. The first step is to measure the rate of change of pressure transmitted to a writing instrument during the writing on a writing surface of at least one sample signature over a plurality of segments. These measurements will yield rate of change of pressure signals. Hereafter, the term pressure signal will indicate the rate of change of pressure signal. The second step is to measure the acceleration of a writing instrument's movement produced by the motion of the putative signer's hand during the writing on a writing surface of at least one signature over a plurality of segments. The latter measurements yield acceleration signals. The third step comprises performing a coherence operation on segments of sample and reference pressure signals and on segments of the sample and reference acceleration signals thereby obtaining pressure and acceleration coherence scores, respectively.

The final step comprises computing a total coherence score which is then compared with a coherence threshold to determine signature validity. This coherence score is essentially the result of an analysis of pressure and acceleration signals in the frequency domain. The method by which the coherence score is computed will be described in more detail below.

DESCRIPTION OF THE PREFERRED EMBODIMENT

Referring now to the drawings, and more particularly to FIG. 1, there is shown a writing instrument 10, a writing surface 15 and a sample signature 18. Also shown are representations of pressure 13 in a direction essentially parallel to the axis 14 of the writing instrument. The two acceleration components 11 and 12 are shown to be essentially orthogonal to each other and lie in a plane 16 essentially orthogonal to the axis 14 of the pen. Included as part of the writing instrument 10 are a piezoelectric transducer 19 and a pair of accelerometers 17, which measure the rate of change of axial pressure and the two components of acceleration, respectively. The rate of change of axial pressure is the pressure in a direction essentially parallel to the axis 14 of the writing instrument 10. Cable 20 connects the pen to a data acquisition terminal. The writing instrument 10 that can be used in the preferred embodiment is described in U.S. Pat. No. 4,513,437 to Chainer et al and was incorporated herein by reference.

Figure 2A:
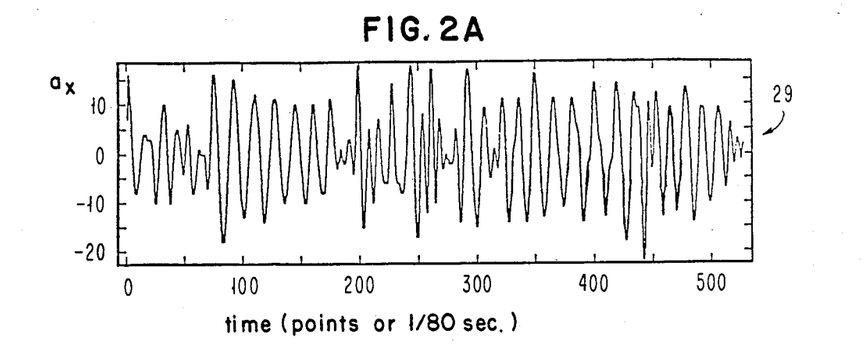
FIGS. 2A–2C are schematic representations of the rate of change of pressure and acceleration signals produced by a sample or reference signature.
Figure 2B:
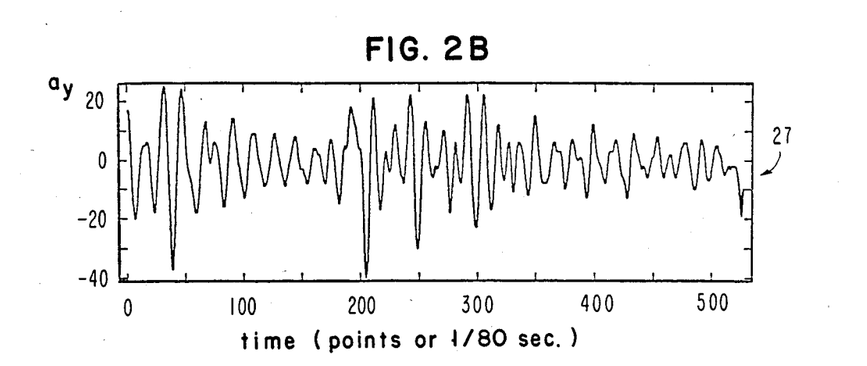
Figure 2C:
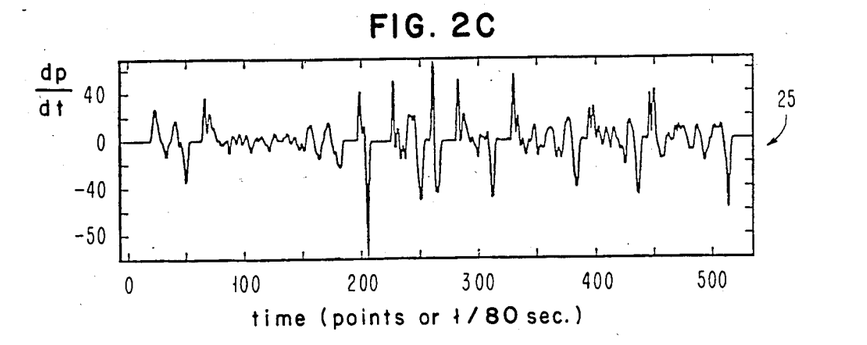
Figure 3A:
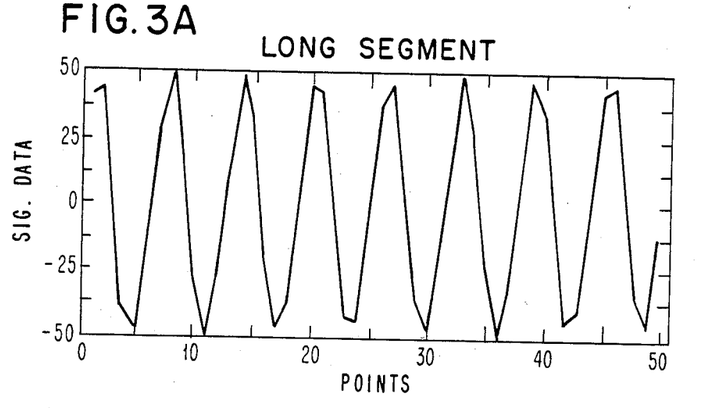
FIGS. 3A–3F are schematic illustrations of 32 point segments with padding of zeros and truncation.
Figure 3B:
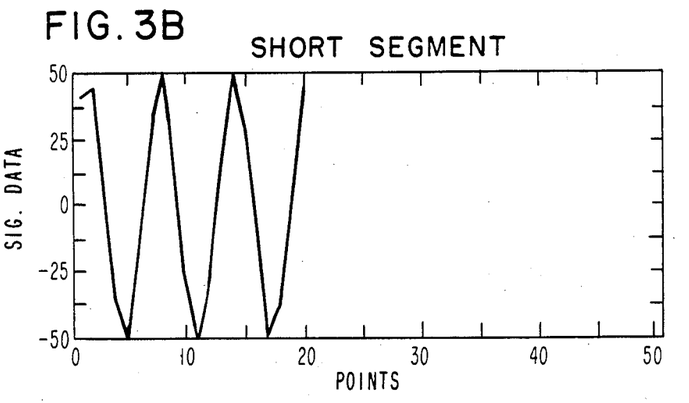
Figure 3C:
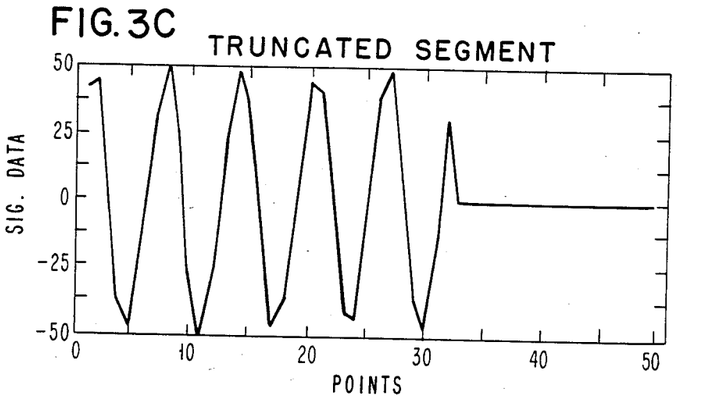
Figure 3D:
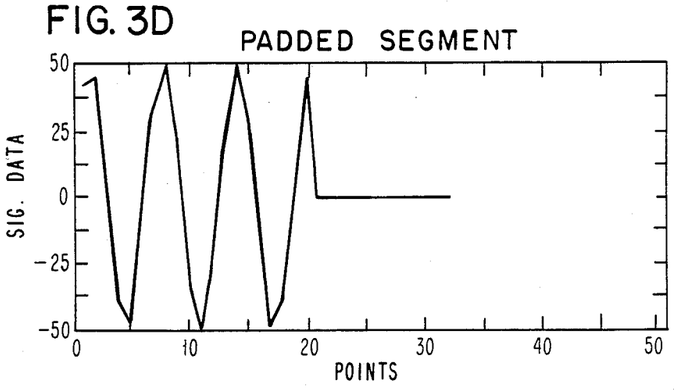
Figure 3E:
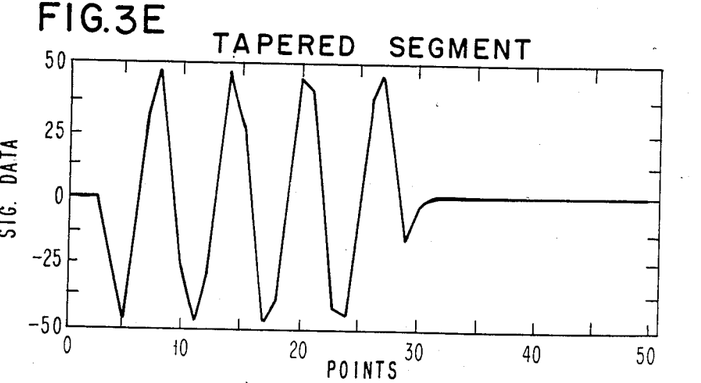
Figure 3F:
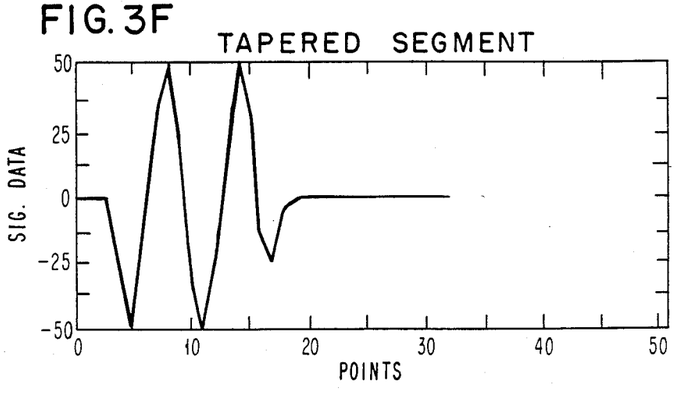

FIG. 2 shows the pressure and acceleration signals (see below) which are obtained from the writing instrument. A piezoelectric pressure transducer and its associated electronics inside the writing instrument 10 measures the rate of change of pressure by producing electrical signals 25, the magnitude of which represents the rate of change of axial pressure. The pressure is transmitted by the signer's hand to the writing instrument 10. The signals 25 representing the rate of change of axial pressure are known as pressure signals. As explained below, the pressure and acceleration signals are changed from an analog format to a digital format. The terms pressure and acceleration signals shall be used to identify the signals in either format. If the pressure signals were transmitted as a result of the reference signature being written, these signals shall be referred to as reference pressure signals. If the pressure signals were transmitted as a result of the sample signature being written, these signals shall be referred to as sample pressure signals.

Also shown in FIG. 2 are the acceleration signals 27 and 29. The accelerometers produce electrical signals representative of the writing instrument's movement produced by the motion of a signer's hand or putative signer's hand during the writing of a signature. These electrical signals are referred to as acceleration signals. The acceleration of the writing instrument in the direction shown by 11 of FIG. 1 is referred to as the X-acceleration signal. Similarly, the acceleration of the writing instrument in the direction shown by 12 of FIG. 1 is referred to as the Y-acceleration signal. As with pressure signals, the term sample and reference X-acceleration (Y-acceleration) signal shall refer to an X-acceleration (Y-acceleration) signal produced during the writing of a sample and reference signature, respectively.

The pressure signal of FIG. 2 shows that a typical signature is composed of several line segments, a segment being defined as a single time interval during which the pen is in contact with the writing surface. (Pen-down followed by pen-up.) Segments are fundamentally important to our comparison technique because the reproducibility of a signature is evident during pen-down periods, while pen-up periods show greater variability.

Segments are determined by analyzing the signal that is the time derivative of the pressure on the pen tip.

Referring to the pressure signal of FIG. 2, the distinctive properties of a penlift (pen-up followed by pen-down) are evident; the long flat sections near zero, called quiet sections, surrounded by distinctive 'peaks' from the rapid change in pressure as the pen is lifted and then later set back down on the paper. The algorithm has been developed which finds these characteristic regions and is well known in the art and is described in U.S. Pat. No. 4,553,258 to Chainer et al and is incorporated herein by reference.

The segment alignment measure, MIZ, provides a value that indicates how well the segment lengths of the sample and reference compare.

The similarity of the semment lengths of a signature pair is evaluated by $$M_1 = \frac{1}{NSEGS} \sum_{i=1}^{NSEGS} \frac{(seglr_i - segls_i)^2}{seglr_i \times segls_i}$$

where NSEGS is the total number of segments of the signature pair and $seglr_i$ and $segls_i$ are the lengths of corresponding segments in the reference and sample signatures, respectively, in units of number of points. MIZ (or $M_1$) is zero when the segment lengths are identical. Clearly, MIZ (or $M_1$) can only be evaluated when the signatures have the same number of segments. Typically a given sample will not have the same number of segments as the reference. This is due to the natural variability of people and the nature of the segment detection algorithm. Therefore, any difference in the number of segments must be reconciled before the segmentation measure is calculated. The signature with the fewer number of segments has artificial penlifts inserted where they appear to be missing with respect to the other signature. The algorithm for doing this is known in the art and is described by T. J. Chainer, S. C. Gundersen and T. K. Worthington, in the IBM Technical Disclosure Bulletin, Vol. 27, No. 8, p. 4652 (1985). A check for reasonable alignment of the segments, is then performed with the deletion of one segment in each sinnature if improved alignment can be obtained. The algorithm for this procedure is well known in the art and is described by T. J. Chainer, S. C. Gundersen and T. K. Worthington, in the IBM Technical Disclosure Bulletin, Vol. 27, No. 8, p. 4655 (1985). A final manipulation of the segments is required before proceeding to the correlation calculations. This is the splitting of large segments into multiple smaller segments. This is required because the variations shown in signature data increases for segments of long duration. Therefore, when a segment of greater than 45 points, or equivalently 0.56 seconds is detected, it and the corresponding segment in the compared signature is split into the minimum number of segments required so that no created segment exceeds a length of 45 points. Additionally, a flag indicating the starting alignment in the correlation calculations is retained. This technique is known in the art and is described by T. J. Chainer, S. C. Gundersen and T. K. Worthington, in the IBM Technical Disclosure Bulletin, Vol. 27, No. 8, p. 4645 (1985).

The regional correlation function was developed by Herbst and Liu, and is described in U.S. Pat. No. 4,128,829, and is incorporated herein by reference. It is used to produce a pressure correlation measure, pscore, and an acceleration correlation measure, ascore. These two measures are then combined into a single measure $$score = \tfrac{1}{3} pscore + \tfrac{2}{3} ascore$$

which is used in the decision process of whether to accept the sample signature as a true signature. These functions provide information on how alike the waveforms are in the time domain. The pressure regional correlation function operates on paired segments of the pressure signals of a sample and reference signature. The operation on the $i^{th}$ segments of the reference and sample signatures generate $$pscore_i = \mathrm{MAX}_\tau \left[ \frac{\sum_t S_p^i(t) R_p^i(t + \tau)}{\left[\sum_t S_p^i(t)^2\right]^{\frac{1}{2}} \left[\sum_t R_p^i(t)^2\right]^{\frac{1}{2}}} \right]$$

where $pscore_i$ is the maximum value found over the allowed time lags $\tau$, $S_p^i(t)$ is the $i^{th}$ segment pressure signal of the sample signature, and $R_p^i(t)$ is that for the reference signature. The time lags used are dependent upon the initial alignment position that depends on the origin of the segments. If the left or right portion of the segments correspond to a true penlift the segments are left or right aligned, respectively. This alignment is well known in the art and is described by T. J. Chainer, S. C. Gundersen and T. K. Worthington in the IBM Technical Disclosure Bulletin, Vol 27, No. 8, p 4645 (1985). Segments that have been artificially created by splitting large segments might have their origin within the body of the original segment and are aligned about their relative centers. The maximum shift, or time lag, for the pressure correlation is 15% of the total time of the longer segment. pscore is then computed as a weighted sum by $$pscore = \sum_{i=1}^{NSEGS} olapp_i \times pscore_i$$

where the weight factor, $olapp_i$, is the amount of time the two segments overlap divided by the total pen-down time of the reference. The weighting factor effectively reduces the contribution of segments that require large shifts. The segmentation is more consistent for verifies than forgeries and therefore large shifts are less likely for verify signatures. The overlap factor can then be viewed as a means for enhancing the distinguishability of the regional correlation function. This is an example of a case where the absolute value of a measure is reduced in favor of separating the verify and forgery distributions.

The regional acceleration correlation function is computed in a way that is independent of rotations about the pen axis. This is accomplished by combining the X and Y acceleration signals into the, complex pairs, $$R_a(t) = R_x(t) + i\, R_y(t)$$

$$S_a(t) = S_x(t) + i\, S_y(t)$$

where $S_x(t)$ is the x component of acceleration and $S_y(t)$ the y component of acceleration of the sample signature. $R_x(t)$ and $R_y(t)$ are those quantities of the reference signature.

The regional acceleration correlation function operates on paired segments of acceleration signals and can then be expressed as $$ascore_i = \text{MAX}_\tau \left[ \frac{\left| \sum_t S_a^i(t) R_a^{i*}(t+\tau) \right|}{\left[ \sum_t |S_a^i(t)|^2 \right]^{\frac{1}{2}} \left[ \sum_t |R_a^i(t)|^2 \right]^{\frac{1}{2}}} \right]$$

where "| |" symbols indicate the magnitude of the complex quantities. $ascore_i$ is the maximum value found over allowed time lags $\tau$ over the $i^{th}$ segments of the reference and sample signatures. The maximum allowed time lag is $\pm 1$ point. Rotations about the pen axis produce a phase factor that is eliminated by using the magnitude of the sum of complex correlation for each segment. The amount of shifting for the acceleration correlation function is limited to $+/-1$ point from the final alignment found in evaluating the pressure correlation function since the acceleration signals are "phase-locked" to the pressure signal as described in U.S. Pat. Nos. 4,562,592 and 4,553,259. The regional acceleration correlation score, ascore, is then found by $$ascore_i = \sum_{i=1}^{NSEGS} olapa_i \times ascore_i$$

The term correlation function shall refer to either regional pressure correlation or regional acceleration correlation.

The total correlation score is then calculated by $$score = \tfrac{1}{3} pscore + \tfrac{2}{3} ascore$$

mentioned above, former signature verification algorithms have based a decision on whether to accept or reject a decision on a correlation function for pressure and acceleration. However, good forgery attempts will yield correlation scores which are comparable with scores obtained by a substantial portion of true verification signatures. This selected region where the scores are comparable to the scores of true verification signatures is known as the grey region.

Figure 4:
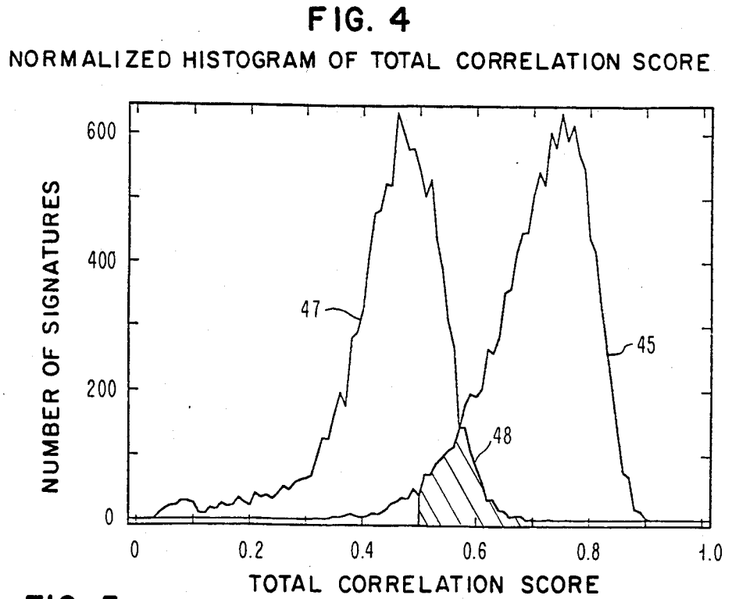
FIG. 4 is a normalized histogram of the total correlation score from a sampling of true signatures (on the right) and forgeries (on the left).

A normalized histogram of total correlation scores obtained by a number of signatures is shown in FIG. 4. The curve 45 on the right represents true signatures while the curve on the left 47 represents forgeries. The selected interval or grey region 48. When a correlation score for a signature is within this selected interval 48 (or grey region), then a coherence score is compared with a coherence threshold, as further described below. If the correlation score for a signature falls to the right of the selected region, the signature is accepted as valid. If the correlation score for a signature falls to the left of this selected region, the signature is rejected as a forgery.

The technique that is used in the above situation is to provide an additional test for signatures in the grey region. The additional test is to make a comparison between the reference signature and sample signature in the frequency domain by using the discrete magnitude squared coherence function $\gamma^2(f)$, hereafter referred to as just the coherence function. This function is defined by $$\gamma^2(f) = \frac{|G_{rs}(f)|^2}{|G_{rr}(f)| |G_{ss}(f)|}$$

where f is the frequency, $G_{rs}(f)$ is the cross spectral density function between the reference and sample signals, and $G_{rr}(f)$ and $G_{ss}(f)$ are auto spectral densities of the reference and sample signals respectively. $\gamma^2(f)$ provides information on the relative power contained in the signals at frequency f.

The conventional use of the coherence function is as a comparison between an input and output signal of a linear two-port system. A value of one indicates that the frequency content of the two signals at frequency f is identical. A value less than one indicates that the output signal has contributions due to random noise and/or system nonlinearities. In our system, we interpret the reference as the input signal, the sample as the output signal and the system as the user variability plus any noise sources inherent in the hardware.

To obtain meaningful results from the coherence function it is necessary to construct pseudo-signatures from the input waveforms. The reconstruction serves three purposes:

to time align each pair of segments in the reference and sample, by using the time lag that maximized the regional correlation function;

to force each segment into an N-point segment of the pseudo-signature by truncation or padding with zeros; and to taper the pseudo-signature's segments to eliminate artificial high frequency Fourier components introduced by truncation of the waveforms.

Choosing a power of 2 for N prepares the signals for conversion to the frequency domain by the use of an efficient fast Fourier transform algorithm. The choice of 32 point segments provides an adequate number of segments for establishing reliable spectral estimates with minimal data loss at the end of some segments. To elaborate, the 80 Hz sampling rate has been observed to be the minimum sampling rate without degradation of the regional correlation scores. The choice of a 2.5 Hz frequency resoluti,on has been shown to be an optimum choice under the constraints of using an 80 Hz sampling rate for the signature data and requiring segments of length equal to a power of 2 for computational efficiency. This equates to using 32 point segments for the pseudo-signature. The choice of 16 point segments provides too coarse a frequency resolution of 5 Hz giving only 3 measures in the 2.5–15 Hz range of interest. The choice of 64 point segments, while providing a finer resolution of 1.25 Hz reduces the number of segments in the pseudo-signature by a factor of 2 thereby reducing the accuracy of the spectral densities. Experiments with this choice have shown that the optimum performance is obtained with the selection of 32 point segments. Segments that differ in length from 32 points are padded with zeros or truncated to attain a 32 point length. The tapering of the ends of these pseudo-signature segments referred to above is accomplished by multiplying each segment with the windowing function:

$$w(i) = \begin{cases} 0.0200000 & i = 1, \text{MIN}(32, NPTS) \\ 0.0263157 & i = 2, \text{MIN}(31, NPTS\text{-}1) \\ 0.0714285 & i = 3, \text{MIN}(30, NPTS\text{-}2) \\ 0.5000000 & i = 4, \text{MIN}(29, NPTS\text{-}3) \\ 1.0000000 & \text{otherwise} \end{cases}$$

where NPTS is the number of points in the segment.

The spectral densities are computed by the Welch method of time averaging the N-point segments of the pseudo-signature. The Welch method is known in the art, and is described in an IEEE article entitled "Trans Audio Electroacoustics" by P. D. Welch, Vol. AU-15, p. 70 (1970). A 32 point fast Fourier transform is used to provide a frequency resolution of 2.5 Hz from zero to the Nyquist cutoff of 40 Hz. The cross power spectral density is given by $$G_{rs}(f) = \frac{1}{NSEGS} \sum_{i=1}^{NSEGS} g_{rs}^{j}(f)$$

where NSEGS is the total number of segment pairs in the reference and sample pseudo-signatures and $g_{rs}$ is the contribution from segment pair i and is given by $$g_{rs}^{i}(f) = S_{j}^{i*}(f) \times R_{j}^{i}(f)$$

where $S_j^i(f)$ and $R_j^i(f)$ are the Fourier coefficients of the sample and reference pseudo-signature's $$R_j^i(f) = \sum_{n=0}^{N-1} R_p^i(t) e^{-in2\pi ft}$$

$$S_j^i(f) = \sum_{n=0}^{N-1} S_p^i(t) e^{-in2\pi ft}$$

The pressure coherence score obtained from the coherence function is computed by $$cpscore = \frac{1}{5} \sum_{n=1}^{5} \gamma_p^2(nf_o)$$

where $f_o$, the fundamental frequency, is 2.5 Hz. The spectral densities show that nearly all power in the pressure and acceleration signals is below 15 Hz, and the data acquisition hardware has been designed with this in mind. The pressure coherence score, cpscore, is therefore created by taking the mean of the coherence function in the range from 2.5–12.5 Hz where the 32 point Fourier transform provides a frequency resolution of 2.5 Hz.

The acceleration signals are treated in an analogous way to the pressure signals except for use of complex acceleration signals which supply the required rotational invariance to the coherence function. Rotational invariance is accomplished by combining the two orthogonal acceleration signals into the complex pair.

$$r(t) = r_x(t) + i\, r_y(t)$$

$$s(t) = s_x(t) + i\, s_y(t)$$

where $r_x(t)$ and $r_y(t)$ represent the signals from the x accelerometer and the y accelerometer, respectively, for the reference signature $s_x(t)$ and $s_y(t)$ represent the same quantities for the sample signature. With the above definitions the procedure outlined above for the pressure signals becomes applicable for the acceleration signals as well.

The acceleration coherence score is then computed by $$cascore = \frac{1}{4} \sum_{n=2}^{5} \gamma_a^2(nf_o)$$

where, in this case, the sum covers the frequency range from 5–12.5 Hz.

Figure 5:
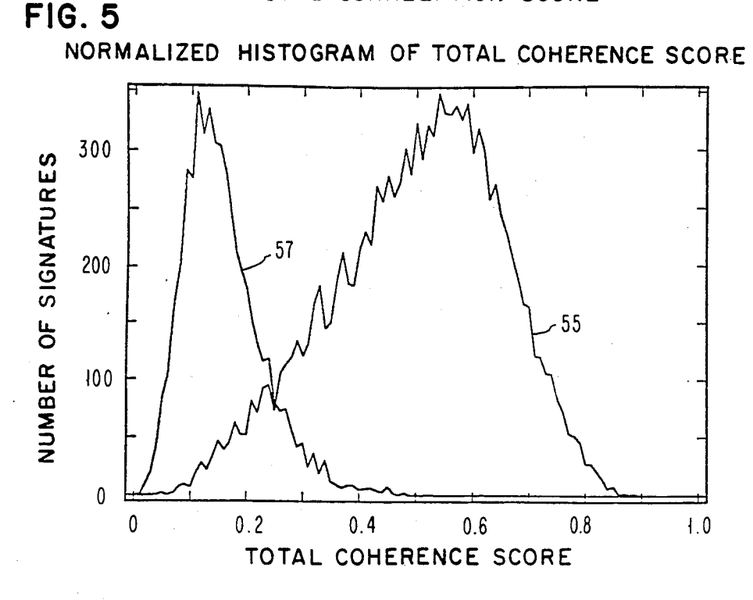
FIG. 5 is a normalized histogram of the total coherence score from a sampling of true signatures (on the right) and forgeries (on the left).

A total coherence score is then calculated by $$cscore = \tfrac{1}{3}\, cpscore + \tfrac{2}{3}\, cascore$$

and is the measure used in the decision process. A normalized histogram of the coherence score is shown in FIG. 5. The curve 55, on the right, represents true signatures, while the curve 57, on the left, represents forgeries. The Accept-Reject Decision Process is described below.

Figure 6:
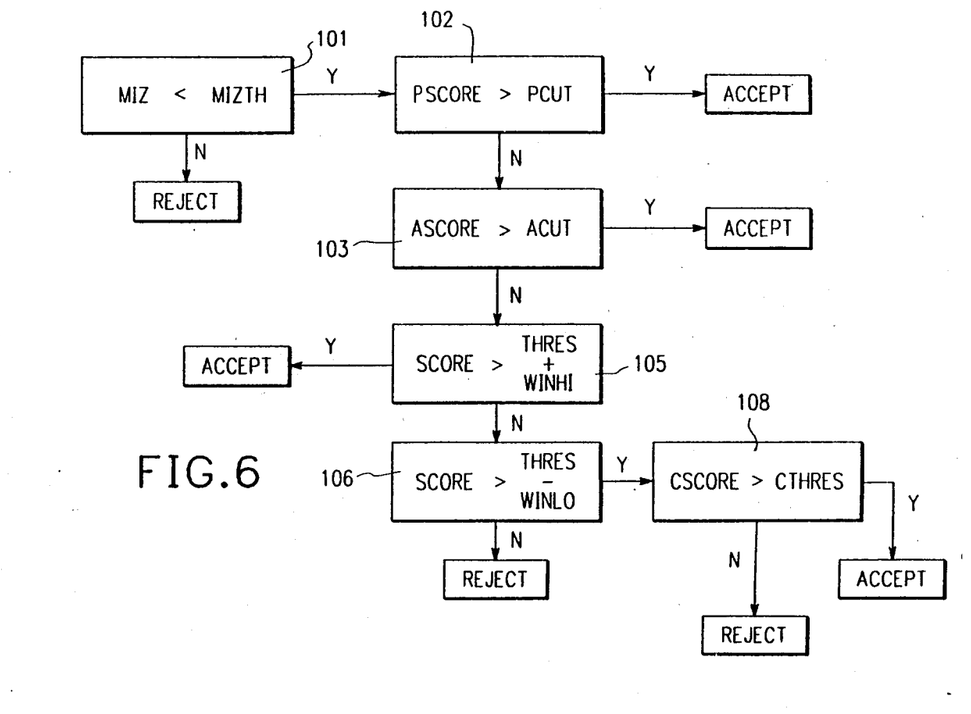
FIG. 6 is a flow diagram representing the overall signature verification decision process.

For clarity the decision process is presented in FIG. 6 which clearly indicates the sequential nature of the decision process. Briefly, the meaning of each quantity shown in FIG. 6 is:
score—total correlation score
cscore—total coherence score
ascore—acceleration correlation score
pscore—pressure correlation score
miz—segmentation measure
pcut—quick acceptance threshold for high pressure score
acut—quick acceptance threshold for high acceleration score
thres—correlatipn threshold
cthres—coherence threshold
mizth—segmentation measure threshold
winlo—lower extent of the correlation grey region
winhi—upper extent of the correlation grey region The correlation threshold and the coherence threshold are determined at the time of enrollment. The set of enrollment signatures are compared against each other and the average correlation score minus 0.1 is used to set the user's correlation threshold, thres. Similarly, the average coherence score minus 0.1 is used as the user's coherence threshold, cthres. Both of these thresholds are limited to an acceptable range. The range for the correlation threshold, thres, being 0.62–0.66, and that for the coherence threshold, cthres, 0.35–0.50. The values of the remaining parameters involved in the decision process are:
pcut=0.78
acut=0.78
mizth=0.1
winlo=0.05
winhi=0.03

FIG. 6 represents the decision against one reference signature. In the event of rejection, the procedure is then performed on the second reference.

The flow diagram for the verification of a sample signature of a putative signer is schematically illustrated in FIG. 6 and will now be described. First the sample signature undergoes a segmentation similarity test as described above. The measure MIZ is identified above.

In decision block 101 if MIZ is greater than a minimum threshold MIZTH, the sample signature is rejected as a forgery. If not, the verification process continues. If the sample signature passes the segmetation test, then the pressure correlation score (pscore) is computed for the sample signature as described above. The pressure correlation score is then compared, see decision block 102, with a quick acceptance pressure threshold, pcut. If the pcut is exceeded, the signature is accepted. If not, the acceleration corrllation score is computed and compared, see decision block 103, with a quick acceptance acceleration threshold acut. If the quick acceleration threshold is exceeded, the signature is accepted as valid. If not, the total correlation score (score) is computed to determine where it lies in relation to the interval thres−winlo to thres+winhi. If the total correlation score is greater than thres+winhi, the signature is accepted as valid, see decision block 105. If the total correlation score is less than thres−winlo, the signature is rejected. On the other hand, if the score is within the selected interval, see decision blocks 105 and 106, the coherence score is compared with a coherence threshold (cthres), as represented in decision block 108. Then, if the coherence threshold is exceeded, the signature is accepted as valid. If not, the signature is rejected.

The signature verification method described in this application provides improved performance over prior art. Performance improvement with the improved signature verification algorithm described in this application can be summarized in terms of Type I and Type II error rates. The Type I error rate is defined as the percentage of true signatures rejected by the system and the Type II error rate is defined as the percentage of forgeries accepted by the system. Data consisting of signatures from 86 people who provided 2119 verify signatures and 3165 forgery signatures collected from 9/15/83 to 11/18/83 at the IBM Systems Research Institute has shown a 47% reduction in the Type I error rate while simultaneously reducing the Type II error rate by 40%.

Having thus described our invention, what we claim as new, and desire to secure by Letters Patent is:

1. A method of verifying a sample signature of a putative signer, which comprises:
   (a) measuring a rate of change of pressure transmitted by the signer's hand to a writing instrument during the writing on a writing surface of at least one sample signature of the putuve signer, to obtain sample pressure signals over a plurality of segments;
   (b) measuring acceleration of a writing instrument's movement produced by the motion of a putative signer's hand during the writing on a writing surface of at least one sample signature of the putative signer, to obtain acceleration signals over a plurality of segments;
   (c) storing reference pressure signals and reference acceleration signals representative of a known signer's signature, the reference pressure signals and the reference acceleration signals being obtained from a known signer in the same manner as the sample pressure and sample acceleration signals, respectively;
   (d) computing a correlation score for the sample signature by operating on segments of the sample and reference pressure signals and segments of the sample and reference acceleration signals with a correlation function;
   (e) computing a total coherence score when the correlation score is within a selected interval by operating on paired segments of sample and reference pressure signals with a coherence function and by operating on paired segments of sample and reference acceleration signals with a coherence function; and
   (f) comparing the total coherence score with a coherence threshold.

2. A method as recited in claim 1, wherein the selected interval is bounded above by the correlation threshold+winhi and below by the correlation threshold−winlo.

3. A method as recited in claim 2, wherein the correlation threshold approximately equals an average correlation score of a set of enroll signatures minus 0.1.

4. A method as recited in claim 1 wherein the coherence threshold is determined by an average coherence score of a set of enroll signatures minus 0.1.

5. A method of verifying a sample signature of a putative signer, which comprises:
   (a) measuring rate of change of pressure transmitted by the signer's hand to a writing instrument during the writing on a writing surface of at least one sample signature of the putative signer, to obtain sample pressure signals over a plurality of segments, the rate of change of pressure being measured in a direction essentially parallel to the axis of the pen;
   (b) measuring acceleration of a writing instruments's movement produced by the motion of the putative signer's hand during the writing on a writing surface of at least one sample signature of the putative signer, to obtain acceleration signals over a plurality of segments, the acceleration signals comprising two acceleration components which are essentially orthogonal to each other and which are in a plane essentially orthogonal to the axis of the writing instrument;
   (c) storing reference pressure signals and reference acceleration signals representative of a known signer's signature, the reference pressure signals and the reference acceleration signals being obtained in the same manner as the sample pressure and sample acceleration signals, respectively;
   (d) computing a correlation score for the sample signature by operating on paired segents of the sample and reference pressure signals and on paired segments of the sample and reference acceleration signals with a correlation function;
   (e) computing a total coherence score when the correlation score is within a selected interval by operating on paired segments of sample and reference pressure signals and paired segments of sample and reference acceleration signals with a coherence function, the paired segments having been truncated if the segments are greater than 32 points and padded if the segments are less than 32 points, the paired segments then being tapered thereafter;
   (f) comparing the total coherence score with a coherence threshold; and
   (g) accepting the signature as valid if the total coherence score exceeds the coherence threshold.

6. A method of verifying a sample signature of a putative signer, which comprises:
   (a) measuring rate of change of pressure transmitted by the signer's hand to a writing instrument during the writing on a writing surface of at least one saple signature of the putative signer, to obtain sample pressure signals in analog format, the rate of change of pressure being measured in a direction essentially parallel to the axis of the pen;
   (b) measuring acceleration of a writing instrument's movement produced by the motion of the putative signer's hand during the writing on a writing surface of at least one sample signature of the putative signer, to obtain acceleration signals in analog format, the acceleration signals comprising two acceleration components which are essentially orthogonal to each other and which are in a plane essentially parallel to the writing surface;

(c) changing the format of pressure and acceleration signals from analog to digital format by sampling at the rate of 80 hertz;

(d) storing reference pressure signals and reference acceleration signals in digital format representative of a known signer's signature, the reference pressure signals and the reference acceleration signals being obtained in the same manner as the sample pressure and acceleration signals, respectively;

(e) computing a correlation score for the sample signature by operating on paired segments of the sample and reference pressure signals and on paired segments of the sample and reference acceleration signals with a correlation function;

(f) computing a total coherence score when the correlation score is within a selected interval by operating on paired segments of sample and reference pressure signals and paired segments of sample and reference acceleration signals, the segments having been truncated if the segments are greater than 32 points and padded if the segments are less than 32 points, the segments then being tapered thereafter the total coherence score (cscore) being calculated by the formula $$cscore = \tfrac{1}{3} \, cpscore + \tfrac{2}{3} \, cascore$$

where cpscore is the pressure coherence score and cascore is the acceleration coherence score where $$cpscore = \frac{1}{5} \sum_{n=1}^{5} \gamma_p^2 \, (nf_o)$$

and $$cascore = \frac{1}{4} \sum_{n=2}^{5} \gamma_a^2 \, (nf_o)$$

where $f_o$ is the fundamental frequency where $\gamma_p^2(nf_o)$ is the pressure coherence function and $\gamma_a^2(nf_o)$ is the acceleration coherence function, the pressure coherence function and the acceleration coherence function being merely the coherence function with the sample and reference signals being pressure and acceleration signals, respectively, the coherence function being defined by $$\gamma^2(f) = \frac{|G_{rs}(f)|^2}{|G_{rr}(f)| \, |G_{ss}(f)|}$$

where f is the frequency, $G_{RS}(f)$ is the cross spectral density function between the reference and sample signals, and $G_{RR}(f)$ and $G_{SS}(f)$ are auto spectral densities of the reference and sample signals respectively;

(g) comparing the total coherence score with a coherence threshold; and (h) accepting the signature as valid if the total coherence score exceeds the coherence threshold.

* * * * *